US010129387B2

(12) United States Patent
Wang et al.

(10) Patent No.: US 10,129,387 B2
(45) Date of Patent: Nov. 13, 2018

(54) TERMINAL ANTI-LOST METHOD AND TERMINAL

(71) Applicant: Huawei Technologies Co., Ltd., Shenzhen (CN)

(72) Inventors: Zhihong Wang, Nanjing (CN); Mingxing Cai, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/540,863

(22) PCT Filed: Dec. 30, 2014

(86) PCT No.: PCT/CN2014/095605
§ 371 (c)(1),
(2) Date: Jun. 29, 2017

(87) PCT Pub. No.: WO2016/106569
PCT Pub. Date: Jul. 7, 2016

(65) Prior Publication Data
US 2017/0346939 A1    Nov. 30, 2017

(51) Int. Cl.
*H04W 8/22*    (2009.01)
*H04M 1/725*    (2006.01)
(Continued)

(52) U.S. Cl.
CPC ........ *H04M 1/72577* (2013.01); *G06F 21/88* (2013.01); *G08B 21/24* (2013.01); *H04M 1/673* (2013.01); *H04W 8/22* (2013.01)

(58) Field of Classification Search
CPC ... H04M 1/72577; H04M 1/673; G06F 21/88; G08B 21/24; H04W 8/22
See application file for complete search history.

(56) References Cited

U.S. PATENT DOCUMENTS

2007/0213099 A1*  9/2007  Bast ................. G06F 3/0338
                                              455/566
2010/0207721 A1    8/2010  Nakajima et al.
(Continued)

FOREIGN PATENT DOCUMENTS

CN    1589044 A    3/2005
CN    101772018 A    7/2010
(Continued)

OTHER PUBLICATIONS

Machine Translation and Abstract of Chinese Publication No. CN1589044, Mar. 2, 2005, 8 pages.
(Continued)

*Primary Examiner* — Chuong A Ngo
(74) *Attorney, Agent, or Firm* — Conley Rose, P.C.

(57) ABSTRACT

Embodiments of the present disclosure disclose a terminal anti-lost method and a terminal, to resolve a problem that a lost terminal is difficult to find when a user discovers in a timely manner that the terminal is lost. The method in the embodiments of the present disclosure includes: first detecting, by the terminal when receiving a specific instruction, whether the terminal is currently in a lock screen state, where the specific instruction represents an instruction of controlling the terminal to decrease volume and/or an instruction of preventing the terminal from receiving a carrier signal; and skipping executing, by the terminal, the instruction when it is determined that the terminal is in the lock screen state, and controlling the terminal to increase the volume and/or play an alarm tone by using a loudspeaker.

20 Claims, 8 Drawing Sheets

(51) Int. Cl.
  *G08B 21/24* (2006.01)
  *H04M 1/673* (2006.01)
  *G06F 21/88* (2013.01)

(56) References Cited

U.S. PATENT DOCUMENTS

| | | | |
|---|---|---|---|
| 2012/0084691 A1* | 4/2012 | Yun | H04M 1/72519 |
| | | | 715/769 |
| 2012/0244839 A1 | 9/2012 | Shen | |
| 2014/0007223 A1* | 1/2014 | Han | G06F 21/32 |
| | | | 726/16 |
| 2015/0119018 A1* | 4/2015 | Yang | H04W 4/001 |
| | | | 455/419 |

FOREIGN PATENT DOCUMENTS

| | | |
|---|---|---|
| CN | 102624982 A | 8/2012 |
| CN | 102624988 A | 8/2012 |
| CN | 104010088 A | 8/2014 |
| EP | 2866215 A1 | 4/2015 |
| WO | 2012153954 A2 | 11/2012 |
| WO | 2013130338 A1 | 9/2013 |
| WO | 2014000605 A1 | 1/2014 |

OTHER PUBLICATIONS

Machine Translation and Abstract of Chinese Publication No. CN102624982, Aug. 1, 2012, 5 pages.
Machine Translation and Abstract of Chinese Publication No. CN102624988, Aug. 1, 2012, 9 pages.
Machine Translation and Abstract of Chinese Publication No. CN104010088, Aug. 27, 2014, 7 pages.
Foreign Communication From a Counterpart Application, PCT Application PCT/CN2014/095605, English Translation of International Search Report dated Sep. 30, 2015, 2 pages.
Foreign Communication From a Counterpart Application, PCT Application PCT/CN2014/095605, English Translation of Written Opinion dated Sep. 30, 2015, 6 pages.
XP055192167 Openmoko,"Wishlist/Anti-Theft Mode", Mar. 10, 2010, 4 pages.
Machine Translation and Abstract of International Publication No. WO2012153954, Nov. 15, 2012, 45 pages.
Foreign Communication From a Counterpart Application, European Application No. 14909381.7, Extended European Search Report dated Nov. 10, 2017, 9 pages.

* cited by examiner

TERMINAL ANTI-LOST METHOD AND TERMINAL

CROSS-REFERENCE TO RELATED APPLICATIONS

This application is a national stage of International Application No. PCT/CN2014/095605, filed on Dec. 30, 2014, which is hereby incorporated by reference in its entirety.

TECHNICAL FIELD

The present disclosure relates to the communications field, and in particular, to a terminal anti-lost method and a terminal.

BACKGROUND

A terminal device such as a mobile phone or a tablet computer is often lost or stolen, for example, stolen in a subway, on a bus, or at a densely populated place.

To prevent the terminal device from being lost, currently, an anti-lost device may be connected to the terminal by using Bluetooth. When the terminal departs from the anti-lost device carried by a user for a specific distance, the anti-lost device may ring, and the user can discover in a timely manner that the terminal is lost.

Although it is discovered in a timely manner that the terminal is lost, laws and human rights restrict checks such as searching nearby people on the spot. Therefore, a position of the lost terminal cannot be found accurately, and a fact of being robbed has to be accepted.

SUMMARY

Embodiments of the present disclosure provide a terminal anti-lost method and a terminal, to resolve a problem that a lost terminal is difficult to find when a user discovers in a timely manner that the terminal is lost, rapidly lock a position of the terminal, and increase a probability of finding the lost terminal by the user.

A first aspect of the embodiments of the present disclosure provides a terminal anti-lost method, including: detecting, by a terminal when receiving a specific instruction, whether the terminal is currently in a lock screen state, where the specific instruction is used to represent an instruction of controlling the terminal to decrease volume and/or an instruction of preventing the terminal from receiving a downlink carrier signal; and skipping executing, by the terminal, the specific instruction when detecting that the terminal is in the lock screen state, and controlling the terminal to increase the volume and/or play an alarm tone by using a loudspeaker.

With reference to the first aspect of the embodiments of the present disclosure, in a first implementation manner of the first aspect of the embodiments of the present disclosure, the specific instruction includes: a switch-off instruction, a mute instruction, a volume decreasing instruction, or a subscriber identity module (SIM) card removing instruction.

With reference to the first aspect or the first implementation manner of the first aspect of the embodiments of the present disclosure, in a second implementation manner of the first aspect of the embodiments of the present disclosure, the method further includes: when the terminal in the lock screen state detects headset insertion, deactivating, by the terminal, the headset insertion and keeping the loudspeaker effective.

With reference to the second implementation manner of the first aspect of the embodiments of the present disclosure, in a third implementation manner of the first aspect of the embodiments of the present disclosure, after the step of the detecting, by the terminal in the lock screen state, headset insertion, and before the step of the deactivating, by the terminal, the headset insertion and keeping the loudspeaker effective, the method further includes: prompting, by the terminal, a user to cancel the lock screen state of the terminal; and if the lock screen state of the terminal is not canceled in a first predetermined time, triggering the step of the deactivating, by the terminal, the headset insertion and keeping the loudspeaker effective.

With reference to any one of the first aspect to the second implementation manner of the first aspect of the embodiments of the present disclosure, in a fourth implementation manner of the first aspect of the embodiments of the present disclosure, after the step of the detecting that the terminal is in the lock screen state, and before the step of the skipping executing, by the terminal, the specific instruction, the method further includes: prompting, by the terminal, a user to cancel the lock screen state of the terminal; and if the lock screen state of the terminal is not canceled in a second predetermined time, triggering the step of the skipping executing, by the terminal, the specific instruction.

With reference to any one of the first aspect to the fourth implementation manner of the first aspect of the embodiments of the present disclosure, in a fifth implementation manner of the first aspect of the embodiments of the present disclosure, after the step of the skipping executing, by the terminal, the specific instruction, the method further includes: obtaining, by the terminal, a biometric feature of a current user; and uploading the obtained biometric feature to a preconfigured server, and/or sending the obtained biometric feature to another terminal.

With reference to any one of the first aspect to the fourth implementation manner of the first aspect of the embodiments of the present disclosure, in a sixth implementation manner of the first aspect of the embodiments of the present disclosure, after the step of the skipping executing, by the terminal, the specific instruction, the method further includes: obtaining, by the terminal, an environmental parameter of an environment in which a current user is located; and uploading the obtained environmental parameter to a preconfigured server, and/or sending the obtained environmental parameter to another terminal.

With reference to any one of the first aspect to the sixth implementation manner of the first aspect of the embodiments of the present disclosure, in a seventh implementation manner of the first aspect of the embodiments of the present disclosure, after the terminal plays the alarm tone by using the loudspeaker, the method further includes: when the lock screen state of the terminal is canceled, stopping playing, by the terminal, the alarm tone.

A second aspect of the embodiments of the present disclosure provides a terminal, including: a detection module configured to detect, when receiving a specific instruction, whether the terminal is currently in a lock screen state, where the specific instruction is used to represent an instruction of controlling the terminal to decrease volume and/or an instruction of preventing the terminal from receiving a carrier signal; and an alarm module configured to skip executing the specific instruction when the detection module detects that the terminal is in the lock screen state, and control the terminal to increase the volume and/or play an alarm tone by using a loudspeaker.

With reference to the second aspect of the embodiments of the present disclosure, in a first implementation manner of the second aspect of the embodiments of the present disclosure, the specific instruction includes: a switch-off instruction, a mute instruction, a volume decreasing instruction, or a SIM-card removing instruction.

With reference to the second aspect or the first implementation manner of the second aspect of the embodiments of the present disclosure, in a second implementation manner of the second aspect of the embodiments of the present disclosure, the terminal further includes: a deactivation module configured to: when headset insertion is detected in the lock screen state, deactivate the headset insertion and keep the loudspeaker effective.

With reference to the second implementation manner of the second aspect of the embodiments of the present disclosure, in a third implementation manner of the second aspect of the embodiments of the present disclosure, the deactivation module includes: a prompt unit configured to prompt, when the inserted headset is detected in the lock screen state, a user to cancel the lock screen state of the terminal; and a deactivation unit configured to: when the lock screen state is not canceled in a first predetermined time after the prompt unit prompts to cancel the lock screen state, deactivate the headset insertion and keep the loudspeaker effective.

With reference to any one of the second aspect to the second implementation manner of the second aspect of the embodiments of the present disclosure, in a fourth implementation manner of the second aspect of the embodiments of the present disclosure, the terminal further includes: a prompt module configured to prompt, before the alarm module skips executing the instruction, a user to cancel the lock screen state of the terminal; and a trigger module configured to trigger the alarm module when the lock screen state is not canceled in a second predetermined time after the prompt module prompts to cancel the lock screen state.

With reference to any one of the second aspect to the fourth implementation manner of the second aspect in the embodiments of the present disclosure, in a fifth implementation manner of the second aspect of the embodiments of the present disclosure, the terminal further includes: a first obtaining module configured to obtain a biometric feature of a current user when the alarm module skips executing the specific instruction; and a first sending module configured to upload the biometric feature obtained by the first module to a preconfigured server, and/or send the obtained biometric feature to another terminal.

With reference to any one of the second aspect to the fourth implementation manner of the second aspect in the embodiments of the present disclosure, in a sixth implementation manner of the second aspect of the embodiments of the present disclosure, the terminal further includes: a second obtaining module configured to obtain, when the alarm module skips executing the specific instruction, an environmental parameter of an environment in which a current user is located; and a second sending module configured to upload the environmental parameter obtained by the first module to a preconfigured server, and/or send the obtained environmental parameter to another terminal.

With reference to any one of the second aspect to the sixth implementation manner of the second aspect in the embodiments of the present disclosure, in a seventh implementation manner of the second aspect of the embodiments of the present disclosure, the terminal further includes: a stop module configured to stop playing the alarm tone when the alarm module plays the alarm tone by using the loudspeaker and when the lock screen state is canceled.

A third aspect of the embodiments of the present disclosure provides a terminal, including: an input apparatus, an output apparatus, a processor, and a memory; where the input apparatus, the output apparatus, and the memory are connected to the processor; the output apparatus includes a loudspeaker; and by invoking an operation instruction stored in the memory, the processor is configured to perform the following steps: detecting, when receiving a specific instruction, whether the terminal is currently in a lock screen state, where the specific instruction is used to represent an instruction of controlling the terminal to decrease volume and/or an instruction of preventing the terminal from receiving a carrier signal; and skipping executing the specific instruction when detecting that the terminal is in the lock screen state, and controlling the terminal to increase the volume and/or play an alarm tone by using the loudspeaker.

With reference to the third aspect of the embodiments of the present disclosure, in a first implementation manner of the third aspect of the embodiments of the present disclosure, the specific instruction includes a switch-off instruction, a mute instruction, a volume decreasing instruction, or a SIM-card removing instruction.

With reference to any one of the third aspect to the first implementation manner of the third aspect in the embodiments of the present disclosure, in a second implementation manner of the third aspect of the embodiments of the present disclosure, the processor is further configured to perform the following step: when headset insertion is detected in the lock screen state, deactivating the headset insertion and keeping the loudspeaker effective.

With reference to the second implementation manner of the third aspect in the embodiments of the present disclosure, in a third implementation manner of the third aspect of the embodiments of the present disclosure, the processor is further configured to perform the following steps: prompting a user to cancel the lock screen state of the terminal before deactivating the headset insertion; and if the lock screen state is not canceled in a first predetermined time, triggering the step of the deactivating the headset insertion.

With reference to any one of the third aspect to the second implementation manner of the third aspect in the embodiments of the present disclosure, in a fourth implementation manner of the third aspect of the embodiments of the present disclosure, the processor is further configured to perform the following steps: prompting a user to cancel the lock screen state of the terminal before skipping executing the specific instruction; and if the lock screen state is not canceled in a second predetermined time, triggering the step of the skipping executing the specific instruction.

With reference to any one of the third aspect to the fourth implementation manner of the third aspect in the embodiments of the present disclosure, in a fifth implementation manner of the third aspect of the embodiments of the present disclosure, the terminal further includes a transmitter; and the processor is further configured to perform the following steps: obtaining a biometric feature of a current user; and instructing the transmitter to upload the obtained biometric feature to a preconfigured server, and/or instructing the transmitter to send the obtained biometric feature to another terminal.

With reference to any one of the third aspect to the fourth implementation manner of the third aspect in the embodiments of the present disclosure, in a sixth implementation manner of the third aspect of the embodiments of the present disclosure, the terminal further includes a transmitter; and the processor is further configured to perform the following steps: obtaining an environmental parameter of an environment in which a current user is located; and instructing the transmitter to upload the obtained environmental parameter to a preconfigured server, and/or instructing the transmitter to send the obtained environmental parameter to another terminal.

With reference to any one of the third aspect to the sixth implementation manner of the third aspect in the embodiments of the present disclosure, in a seventh implementation manner of the third aspect of the embodiments of the present disclosure, the processor is further configured to perform the following step: when the alarm tone is played by using the loudspeaker, stopping playing the alarm tone if the lock screen state is canceled.

It may be learned from the foregoing technical solutions that the embodiments of the present disclosure have the following advantages: In the embodiments of the present disclosure, when the terminal receives the specific instruction, the terminal first detects whether the terminal is currently in the lock screen state. The specific instruction represents the instruction of controlling the terminal to decrease volume and/or the instruction of preventing the terminal from receiving a carrier signal. When it is determined that the terminal is in the lock screen state, the terminal skips executing the instruction, and controls the terminal to increase the volume and/or play the alarm tone by using the loudspeaker. If a user discovers in a timely manner that the terminal is lost, and the alarm tone is ringing nearby, the user may determine a position of the lost terminal according to a position of the ringing alarm tone, so as to find the lost terminal. If no alarm tone is ringing nearby, because the terminal in the lock screen state skips executing the instruction of controlling the terminal to decrease volume and/or preventing the terminal from receiving a carrier signal, the user may determine a position of the lost terminal by calling the terminal and searching for a nearby terminal that generates a called ringtone, so as to find the lost terminal. Therefore, a probability of finding a lost terminal by a user is increased when the user discovers in a timely manner that the terminal is lost.

DESCRIPTION OF EMBODIMENTS

The following clearly describes the technical solutions in the embodiments of the present disclosure with reference to the accompanying drawings of the present disclosure. The described embodiments are merely some but not all of the embodiments of the present disclosure. All other embodiments obtained by persons skilled in the art based on the embodiments of the present disclosure without creative efforts shall fall within the protection scope of the present disclosure.

The term "carrier signal" is used to represent a signal that is delivered by a base station to a terminal and that is used to call the terminal. If the terminal cannot receive the carrier signal, when another terminal calls the terminal, the terminal cannot receive the call, and does not play a called ringtone.

The term "loudspeaker" represents a speaker that is used to loudly play a sound.

Figure 1:
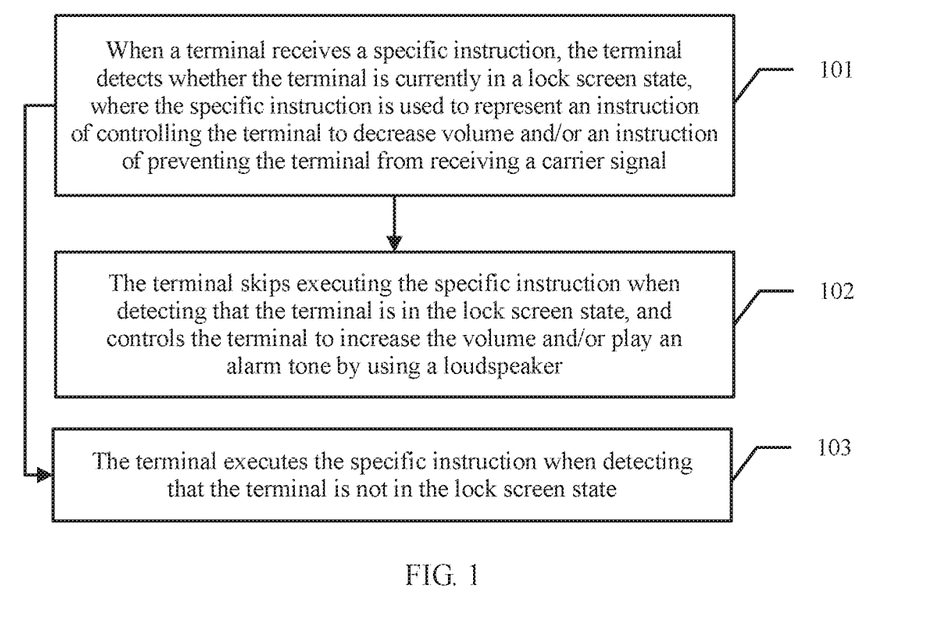
FIG. 1 is a schematic flowchart of a terminal anti-lost method according to an embodiment of the present disclosure.

Referring to FIG. 1, an embodiment of the terminal anti-lost method in the embodiments of the present disclosure includes the following steps.

101. When a terminal receives a specific instruction, the terminal detects whether the terminal is currently in a lock screen state, where the specific instruction is used to represent an instruction of controlling the terminal to decrease volume and/or an instruction of preventing the terminal from receiving a carrier signal.

After stealing a terminal, to hide the terminal, a thief may send a type of specific instruction to the terminal after getting the terminal, and the type of specific instruction may be used to control the terminal to decrease volume or prevent the terminal from receiving a carrier signal. When receiving this type of specific instruction, the terminal may first detect whether the terminal is currently in a lock screen state, instead of immediately executing the received specific instruction.

There are many specific instructions. For example, the instruction of controlling the terminal to decrease volume may be a mute instruction or a volume decreasing instruction, and the instruction of preventing the terminal from receiving a carrier signal may be a switch-off instruction or a SIM-card removing instruction. It may be understood that there may be another instruction of controlling the terminal to decrease volume or preventing the terminal from receiving a carrier signal. This is not limited herein.

It should be noted that the lock screen state is different from a black screen state. The lock screen state may be a black screen state, or may not be a black screen state, and the black screen state may be a lock screen state, or may not be a lock screen state. The black screen state merely indicates that a screen is not lit up, and any operation may cancel the black screen state and light up the screen. The lock screen state cannot be canceled by any operation, and can be canceled only in a preset unlocking manner. There are many specific unlocking manners, such as entering an unlocking password by a user, or verifying a fingerprint or an iris of the user. There are many other unlocking manners that are not limited herein.

102. The terminal skips executing the specific instruction when detecting that the terminal is in the lock screen state, and controls the terminal to increase the volume and/or play an alarm tone by using a loudspeaker.

When detecting that the terminal is in the lock screen state, the terminal skips executing the received specific instruction, and controls the terminal to increase the volume and/or play the alarm tone by using the loudspeaker.

There may be three feasible processing manners:

Manner 1: Control the terminal to increase the volume, but not play the alarm tone by using the loudspeaker.

Manner 2: Control the terminal not to increase the volume, but play the alarm tone by using the loudspeaker.

Manner 3: Control the terminal to increase the volume, and play the alarm tone by using the loudspeaker.

According to different application situations, any one may be selected. This is not limited herein.

It may be understood that the alarm tone may be a commonly-used alert sound, or may be a specific sound defined by the user, such as a specific song or an animal sound, so that the user identifies in a timely manner a position of the ringing alarm tone.

If the user discovers in a timely manner that the terminal is lost, and a nearby terminal generates the alarm tone, the user can determine in a timely manner a position of the lost terminal and find the lost terminal.

If the user discovers in a timely manner that the terminal is lost, but the alarm tone does not ring nearby, it indicates that the thief does not give the specific instruction to the terminal, or after the specific instruction is sent to the terminal, the terminal does not execute the received specific instruction and increases the terminal volume. In this case, the user may directly call the terminal by using another terminal, and determine the position of the lost terminal by searching for a nearby terminal that generates a called ringtone.

103. The terminal executes the specific instruction when detecting that the terminal is not in the lock screen state.

When detecting that the terminal is not in the lock screen state, the received specific instruction may be a normal operation instruction by the user, and the terminal may execute the received specific instruction.

In this embodiment of the present disclosure, when the terminal receives the specific instruction, the terminal first detects whether the terminal is currently in the lock screen state. The specific instruction represents the instruction of controlling the terminal to decrease volume and/or the instruction of preventing the terminal from receiving a carrier signal. When it is determined that the terminal is in the lock screen state, the terminal skips executing the specific instruction, and controls the terminal to increase the volume and/or play the alarm tone by using the loudspeaker. If a user discovers in a timely manner that the terminal is lost, and the alarm tone is ringing nearby, the user may determine a position of the lost terminal according to a position of the ringing alarm tone, so as to find the lost terminal. If no alarm tone is ringing nearby, because the terminal in the lock screen state skips executing the instruction of controlling the terminal to decrease volume and/or preventing the terminal from receiving a carrier signal, the user may determine a position of the lost terminal by calling the terminal and searching for a nearby terminal that generates a called ringtone, so as to find the lost terminal.

Therefore, a probability of finding a lost terminal by a user is increased when the user discovers in a timely manner that the terminal is lost.

Figure 2:
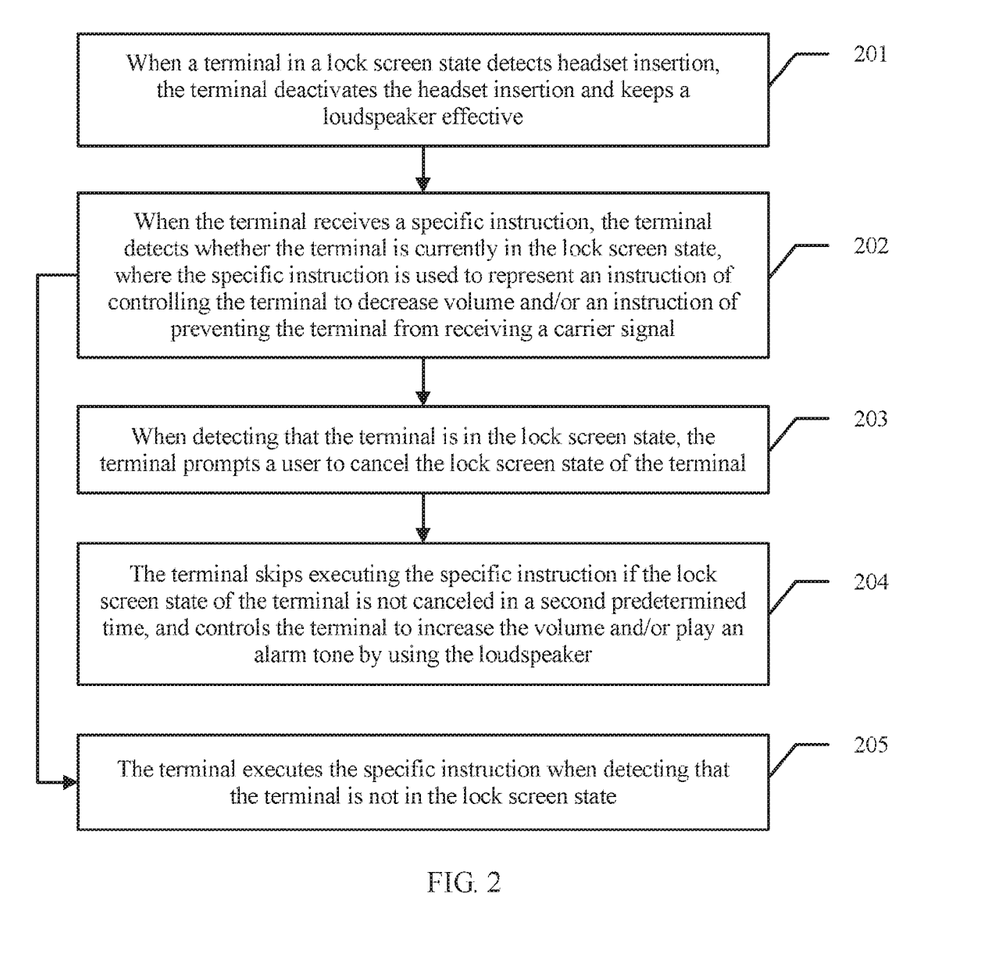
FIG. 2 is another schematic flowchart of a terminal anti-lost method according to an embodiment of the present disclosure.

In the foregoing embodiment, the alarm tone may be played by using the loudspeaker. In an application, if a terminal is stolen by a thief, the thief may insert a headset to deactivate the loudspeaker in the terminal. To resolve this problem, the terminal may perform special processing when headset insertion is detected in a lock screen state. Further, when it is determined that the terminal is currently in the lock screen state, the terminal may also first prompt a user to cancel the lock screen state, and then perform subsequent processing. Referring to FIG. 2, another embodiment of the terminal anti-lost method in the embodiments of the present disclosure includes the following steps.

201. When the terminal in a lock screen state detects headset insertion, the terminal deactivates the headset insertion and keeps the loudspeaker effective.

It may be understood that currently, in a terminal that has both a headset jack and a loudspeaker, when no headset is inserted, the loudspeaker is effective, and the loudspeaker is used as audio output. When a headset is inserted, the loudspeaker is deactivated, the loudspeaker is no longer used as audio output, and only the inserted headset is used as audio output. To prevent the thief from inserting the headset and deactivating the loudspeaker of the terminal, when the terminal is in the lock screen state, if the terminal detects headset insertion, the terminal deactivates the headset insertion, that is, a headset insertion operation in this state does not deactivate the loudspeaker. The loudspeaker remains effective, and the loudspeaker is still used as audio output of the terminal.

Optionally, in an application, before deactivating the headset insertion, the terminal may first prompt a user to cancel the lock screen state of the terminal. If the lock screen state of the terminal is not canceled in a first predetermined time, the step of the deactivating the headset insertion and keeping the loudspeaker effective is triggered. It may be understood that, a real user can immediately cancel the lock screen state of the terminal after receiving the prompt, but a thief cannot immediately cancel the lock screen state of the terminal after receiving the prompt because the thief does not know how to unlock a screen, or does not know a password, or the like.

After the terminal prompts the user to cancel the lock screen state of the terminal, if the lock screen state of the terminal is not canceled in the first predetermined time, it indicates that a current user of the terminal may not be the real user, and the terminal deactivates the headset insertion and keeps the loudspeaker effective. If the lock screen state of the terminal is canceled in the first predetermined time, it indicates that the user may be the real user, and the terminal may execute the received headset insertion instruction. It should be noted that the foregoing optional step may not be performed with step 203 and step 204 at the same time. For example, when receiving the specific instruction, if the terminal detects that the terminal is currently in the lock screen state and detects the inserted headset, the terminal may perform only step 203 to prompt the user to cancel the lock screen state of the terminal. Two prompt operations are not performed at a same time.

It may be understood that a time for performing step 201 may be in a whole process when the terminal is in the lock screen state, and is not limited to before step 202. In addition, in some scenarios, such as in the lock screen state, if the terminal does not receive the headset insertion instruction, step 201 is not performed. This is not limited herein.

202. When the terminal receives a specific instruction, the terminal detects whether the terminal is currently in the lock screen state, where the specific instruction is used to represent an instruction of controlling the terminal to decrease volume and/or an instruction of preventing the terminal from receiving a carrier signal.

Step 202 is similar to step 101, and details are not described herein again.

In addition, optionally, in a terminal that has a built-in backup battery, battery removal detection by the terminal may also be one specific instruction. If the terminal detects battery removal, the terminal does not power off immediately. The terminal may activate the built-in backup battery to supply power, detect whether the terminal is currently in a lock screen state, and perform a subsequent operation.

203. When detecting that the terminal is in the lock screen state, the terminal prompts a user to cancel the lock screen state of the terminal.

When detecting that the terminal is in the lock screen state, the terminal first prompts the user to cancel the lock screen state of the terminal.

It may be understood that the terminal may prompt the user to cancel the lock screen state in multiple manners, for example, directly popping up a dialog box to prompt the user to cancel the lock screen state, or vibrating the terminal and prompting in voice to the user to cancel the lock screen state. There may be many other manners that are not limited herein.

It may be understood that when prompting the user to cancel the lock screen state of the terminal, the terminal may display a countdown timer on the terminal at the same time, to prompt the user to cancel the lock screen state before the countdown timer expires.

204. The terminal skips executing the specific instruction if the lock screen state of the terminal is not canceled in a second predetermined time, and controls the terminal to increase the volume and/or play an alarm tone by using the loudspeaker.

After the terminal prompts the user to cancel the lock screen state, the terminal skips executing the received specific instruction if the lock screen state of the terminal is not canceled in the second predetermined time, and controls the terminal to increase the volume and/or play the alarm tone by using the loudspeaker.

It may be understood that the first predetermined time and the second predetermined time may be set at delivery, or may be defined by the user, and the first predetermined time and the second predetermined time may be the same, or may be different. This is not limited herein.

If the lock screen state of the terminal is canceled in the second predetermined time, the terminal executes the received instruction of controlling the terminal to decrease the volume or make no response.

Optionally, in the solution of performing the step of controlling the terminal to increase the volume, to enable the user to easily hear a called ringtone of the terminal, or to improve an effect of playing the alarm tone by the loudspeaker, the terminal volume may be controlled to increase to a maximum. Certainly, in an application, the volume may be increased to another value, such as 98% or 90% of total volume. This is not limited herein.

Optionally, in application, a user misoperation may occur. The specific instruction is given to the terminal when the lock screen state is not canceled, and the lock screen state of the terminal is not canceled in the second predetermined time because the user is nervous or time is limited, thereby causing the terminal to play the alarm tone. In this scenario, the following step may exist: when the lock screen state of the terminal is canceled, stopping, by the terminal, playing the alarm tone.

205. The terminal executes the specific instruction when detecting that the terminal is not in the lock screen state.

Step 205 is similar to step 103, and details are not described herein again.

In this embodiment of the present disclosure, if the terminal in the lock screen state receives the headset insertion instruction, the terminal deactivates the headset insertion and keeps the loudspeaker effective, so as to avoid a case in which an alarm tone or a called ringtone cannot be played by using the loudspeaker because a thief that steals the terminal inserts a headset to deactivate the loudspeaker of the terminal. Further, when receiving the specific instruction and detecting that the terminal is in the lock screen state, the terminal first prompts the user to cancel the lock screen state of the terminal, instead of directly controlling the terminal to increase volume and/or play the alarm tone. The terminal can control, only when the lock screen state is not canceled in the second predetermined time, the terminal to increase the volume and/or play the alarm tone. This avoids frequently increasing the volume or playing the alarm tone that is caused because the user performs a misoperation or forgets to cancel the lock screen state, and greatly improves human-machine interaction performance of the terminal.

Figure 3:
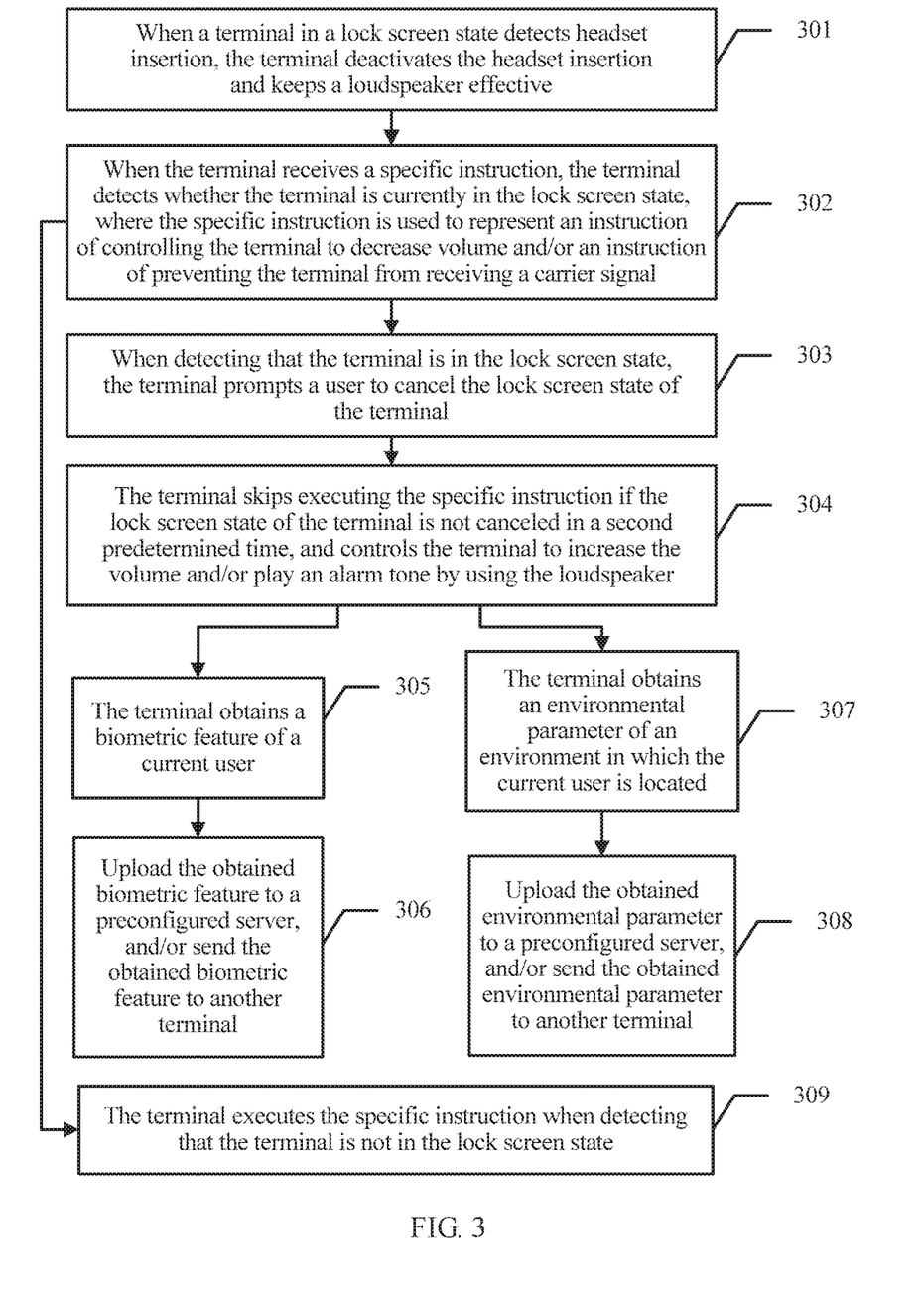
FIG. 3 is another schematic flowchart of a terminal anti-lost method according to an embodiment of the present disclosure.

In the foregoing embodiment, the terminal plays the alarm tone. In an application, while playing the alarm tone, the terminal may further collect related information of a current user and upload the related information of the current user to a server. Referring to FIG. 3, another embodiment of the terminal anti-lost method in the embodiments of the present disclosure includes the following steps.

301. When the terminal in a lock screen state detects headset insertion, the terminal deactivates the headset insertion and keeps the loudspeaker effective.

302. When the terminal receives a specific instruction, the terminal detects whether the terminal is currently in the lock screen state, where the specific instruction is used to represent an instruction of controlling the terminal to decrease volume and/or an instruction of preventing the terminal from receiving a carrier signal.

303. When detecting that the terminal is in the lock screen state, the terminal prompts a user to cancel the lock screen state of the terminal.

304. The terminal skips executing the specific instruction if the lock screen state of the terminal is not canceled in a second predetermined time, and controls the terminal to increase the volume and/or play an alarm tone by using the loudspeaker.

Step 301 to step 304 are similar to step 201 to step 204, and details are not described herein again.

305. The terminal obtains a biometric feature of a current user.

The terminal may obtain the biometric feature of the current user when skipping executing the received specific instruction. The biometric feature may include a fingerprint, an iris, a picture, or the like.

The terminal may detect a fingerprint of the current user by using a touchscreen, and/or the terminal may photograph a picture of the current user by using a camera, and/or the terminal may identify iris information of the current user by using the camera, or the like.

Alternatively, the terminal may obtain information about another aspect of the current user in another manner that is not limited herein. The obtained information of the current user may be one or more of the foregoing information. This is not limited herein.

306. Upload the obtained biometric feature to a preconfigured server, and/or send the obtained biometric feature to another terminal.

After obtaining the biometric feature of the current user, the terminal uploads the obtained biometric feature to the preconfigured server, and/or sends the obtained biometric feature to the another terminal.

It may be understood that the preconfigured server may be provided by an equipment vendor to which the terminal belongs, or may be defined by the user. This is not limited herein. The another terminal may also be preset by the user.

307. The terminal obtains an environmental parameter of an environment in which the current user is located.

When skipping executing the received specific instruction, the terminal may further obtain the environmental parameter of the environment in which the current user is located. The environmental parameter may include a geographical position, environment information, or the like.

The terminal may lock a current position of the terminal (that is, the current user) by using a built-in global positioning satellite (GPS) capability, and/or the terminal may obtain the environmental parameter around the terminal by using a built-in sensor (such as a temperature sensor, a humidity sensor, an infrared sensor, or the like).

308. Upload the obtained environmental parameter to a preconfigured server, and/or send the obtained environmental parameter to another terminal.

After obtaining the environmental parameter of the environment in which the current user is located, the terminal uploads the obtained environmental parameter to the preconfigured server, and/or sends the obtained environmental parameter to the another terminal.

It may be understood that the preconfigured server may be provided by an equipment vendor to which the terminal belongs, or may be defined by the user. This is not limited herein. The another terminal may also be preset by the user.

It may be understood that step 307 and step 308, or step 305 and step 306 or both may be executed, and a time sequence between step 307 and step 308, and step 305 and step 306 is not limited. For example, the biometric feature and the environmental parameter may be obtained and then sent at the same time, or the first obtained one may be first sent. This is not limited herein.

309. The terminal executes the specific instruction when detecting that the terminal is not in the lock screen state.

Step 309 is similar to step 205, and is not limited herein.

In this embodiment of the present disclosure, while controlling the terminal to increase the volume or play the alarm tone, the terminal may further obtain the biometric feature or the environmental parameter of the current user, and upload the obtained biometric feature or the obtained environmental parameter to the preconfigured server or send the obtained biometric feature or the obtained environmental parameter to the another terminal. In this way, if a user does not discover in a timely manner that the terminal is lost, or the lost terminal is not near the user, the user may obtain the biometric feature or the environmental parameter of the current user that is received by the preconfigured server or the another terminal, and turn to a police station for help, so as to find the lost terminal.

It may be understood that in an application, it may be set that the execution steps of the terminal anti-lost method in the foregoing embodiments are performed after a specific function in the terminal is enabled. For example, an anti-lost option may exist in the settings option of the terminal. If the anti-lost option is enabled, the steps of the terminal anti-lost method in the foregoing embodiments may be performed. If the anti-lost option is disabled, the foregoing steps may not be performed, and an instruction received by the terminal is immediately executed in a current manner.

For ease of understanding, the following uses a specific application scenario to describe in detail the terminal anti-lost method in the embodiments of the present disclosure.

At a train station, a terminal of a user A is stolen by a thief B.

To prevent the user A from calling the terminal after the user A discovers that the terminal is lost, the thief B gives a switch-off instruction to the terminal.

After receiving the switch-off instruction, the terminal detects that the terminal is currently in a lock screen state, and prompts the user to cancel the lock screen state of the terminal.

The thief B does not know an unlocking password, and cannot cancel the lock screen state of the terminal after two attempts. At this time, a 5-second preset unlocking time expires. The terminal determines that the lock screen state is not canceled in 5 seconds, skips executing the switch-off instruction, adjusts volume to a maximum, and plays an alarm tone by using a loudspeaker.

At this time, the thief B takes out a headset, and inserts the headset into a headset jack of the terminal to prevent the terminal from generating a sound. After receiving a headset insertion instruction, the terminal prompts the user to cancel the lock screen state of the terminal. The thief cannot cancel the lock screen state of the terminal in the preset 5 seconds, and the terminal deactivates the headset insertion and keeps the loudspeaker effective to continuously play the alarm tone.

At the same time, the terminal detects a fingerprint of the thief B by using a touchscreen, photographs a picture of the thief B by using a camera, locks a current position of the thief B by using a built-in GPS, and sends all the obtained information to a preconfigured server.

The user A discovers in a timely manner that the terminal is lost after the terminal is stolen, and hears the alarm tone ringing nearby.

The user A immediately finds the thief B according to the position of the ringing alarm tone, and finds the lost terminal.

The foregoing gives a scenario in which a terminal is stolen and found, and the following gives a scenario of a user misoperation.

Because of a misoperation, a user A gives a volume decreasing instruction to a terminal when the terminal is in a lock screen state.

The terminal prompts the user A to cancel the lock screen state of the terminal.

In a first case, the lock screen state of the terminal is canceled in the preset 5 seconds, and the terminal performs a volume decreasing operation.

In a second case, the user A does not cancel the lock screen state of the terminal in the preset 5 seconds because of nervousness. The terminal skips executing the volume decreasing instruction, and plays an alarm tone by using a loudspeaker.

When the terminal plays the alarm tone, the user A actively cancels the lock screen state of the terminal. After detecting that the lock screen state is canceled, the terminal stops playing the alarm tone.

Figure 4:
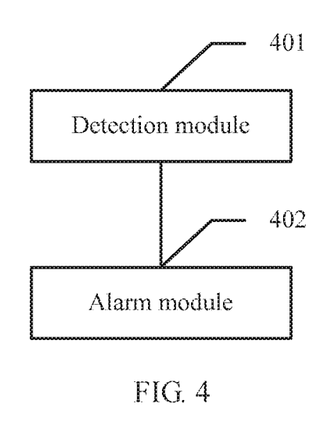
FIG. 4 is a schematic structural diagram of a terminal according to an embodiment of the present disclosure.

The following describes the terminal in the embodiments of the present disclosure. Referring to FIG. 4, an embodiment of the terminal in the embodiments of the present disclosure includes: a detection module 401 configured to detect, when receiving a specific instruction, whether the terminal is currently in a lock screen state, where the specific instruction is used to represent an instruction of controlling the terminal to decrease volume and/or an instruction of preventing the terminal from receiving a carrier signal; and an alarm module 402 configured to skip executing the specific instruction when the detection module 401 detects that the terminal is in the lock screen state, and control the terminal to increase the volume and/or play an alarm tone by using a loudspeaker.

There are many specific instructions. For example, the instruction of controlling the terminal to decrease volume may be a mute instruction or a volume decreasing instruction, and the instruction of preventing the terminal from receiving a carrier signal may be a switch-off instruction or a SIM-card removing instruction. It may be understood that there may be another instruction of controlling the terminal to decrease volume or preventing the terminal from receiving a carrier signal. This is not limited herein.

In this embodiment of the present disclosure, when the terminal receives the specific instruction, the detection module 401 first detects whether the terminal is currently in the lock screen state. The specific instruction represents the instruction of controlling the terminal to decrease volume and/or the instruction of preventing the terminal from receiving a carrier signal. When it is determined that the terminal is in the lock screen state, the alarm module 402 skips executing the specific instruction, and controls the terminal to increase the volume and/or play the alarm tone by using the loudspeaker. If the user discovers in a timely manner that the terminal is lost, and the alarm tone is ringing nearby, the user may determine a position of the lost terminal according to a position of the ringing alarm tone, so as to find the lost terminal. If no alarm tone is ringing nearby, because the terminal in the lock screen state skips executing the instruction of controlling the terminal to decrease volume and/or preventing the terminal from receiving a carrier signal, the user may determine a position of the lost terminal by calling the terminal and searching for a nearby terminal that generates a called ringtone, so as to find the lost terminal. Therefore, a probability of finding a lost terminal by a user is increased when the user discovers in a timely manner that the terminal is lost.

Figure 5:
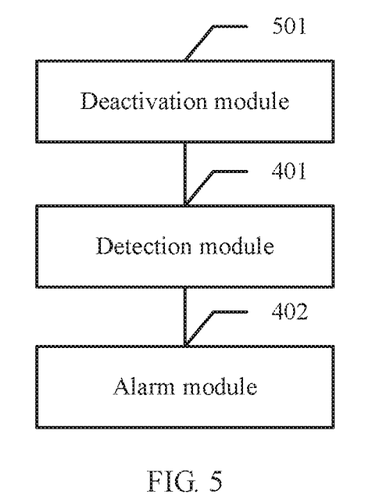
FIG. 5 is another schematic structural diagram of a terminal according to an embodiment of the present disclosure.

In the foregoing embodiment, the alarm module 402 may play the alarm tone by using the loudspeaker. In an application, if a terminal is stolen by a thief, the thief may insert a headset to deactivate a loudspeaker in the terminal. To resolve this problem, the terminal may perform special processing when headset insertion is detected in a lock screen state. Referring to FIG. 5, in another embodiment of the terminal in the embodiments of the present disclosure, the foregoing terminal further includes: a deactivation module 501 configured to: when headset insertion is detected in a lock screen state, deactivate the headset insertion and keep a loudspeaker effective.

In this embodiment of the present disclosure, if the terminal in the lock screen state detects the inserted headset, the deactivation module 501 deactivates the headset insertion and keeps the loudspeaker effective, so as to avoid a case in which a loudspeaker of a terminal is deactivated and a called ringtone or an alarm tone cannot be played by using the loudspeaker because a thief that steals the terminal inserts a headset.

Figure 6:
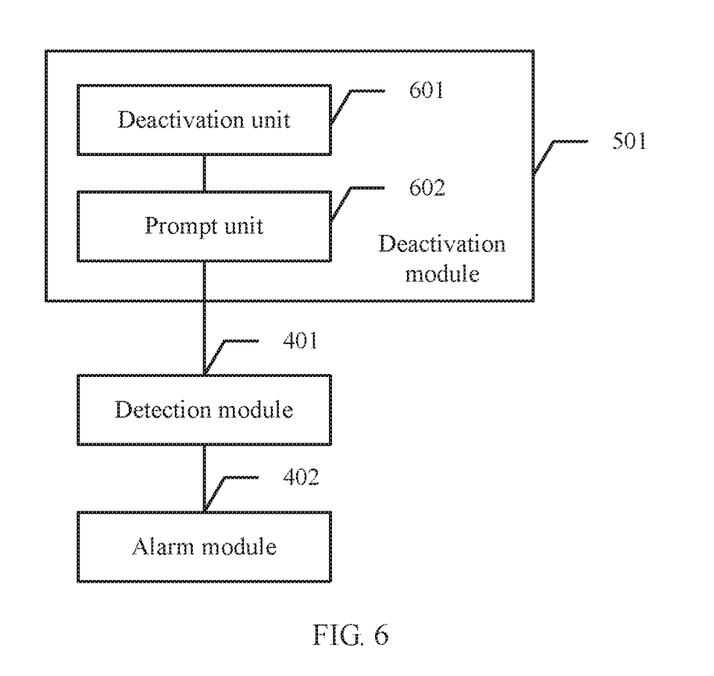
FIG. 6 is another schematic structural diagram of a terminal according to an embodiment of the present disclosure.

In the foregoing embodiment, the deactivation module 501 deactivates the headset insertion and keeps the loudspeaker effective. In an application, to provide better user experience, before the deactivation module 501 deactivates the headset insertion and keeps the loudspeaker effective, a user may be first prompted to unlock a screen. Referring to FIG. 6, in another embodiment of the terminal in the embodiments of the present disclosure, the deactivation module 501 may include: a prompt unit 602 configured to prompt, when headset insertion is detected in a lock screen state, a user to cancel the lock screen state of the terminal; and a deactivation unit 601 configured to: when the lock screen state is not canceled in a first predetermined time after the prompt unit 602 prompts to cancel the lock screen state, deactivate the headset insertion and keep a loudspeaker effective.

In this embodiment, before the deactivation unit 601 deactivates the headset insertion and keeps the loudspeaker effective, the prompt unit 602 first prompts the user to unlock the screen, so as to improve human-machine interaction performance of the terminal.

Figure 7:
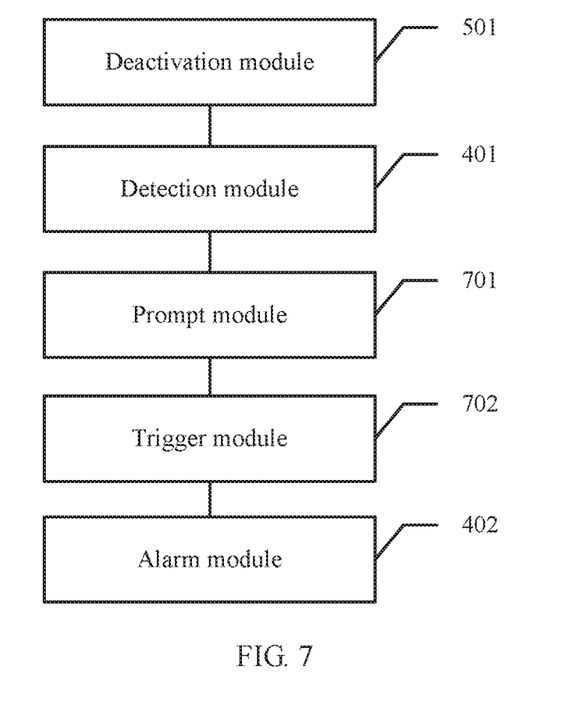
FIG. 7 is another schematic structural diagram of a terminal according to an embodiment of the present disclosure.

In the foregoing embodiment, if the specific instruction is received, and the detection module 401 detects that the terminal is in the lock screen state, the alarm module 402 controls the terminal to increase the volume and/or play the alarm tone by using the loudspeaker. In an application, to avoid frequently increasing the volume or playing the alarm tone because of a user misoperation, the terminal may first prompt to unlock a screen before skipping executing the received specific instruction. Referring to FIG. 7, in another embodiment of the terminal in the embodiments of the present disclosure, the terminal shown in the foregoing FIG. 4 or FIG. 5 further includes: a prompt module 701 configured to prompt, before the alarm module 402 skips executing the instruction, a user to cancel a lock screen state of the terminal; and a trigger module 702 configured to trigger the alarm module 402 when the lock screen state is not canceled in a second predetermined time after the prompt module 701 prompts to cancel the lock screen state.

In this embodiment of the present disclosure, when the specific instruction is received and it is detected that the terminal is in the lock screen state, the alarm module 402 does not directly control the terminal to increase the volume and/or play the alarm tone. The prompt module 701 first prompts the user to cancel the lock screen state of the terminal. The trigger module 702 can trigger, only when the lock screen state is not canceled in the second predetermined time, the alarm module 402 to control the terminal to increase the volume and/or play the alarm tone. This avoids frequently increasing the volume or playing the alarm tone that is caused because the user performs a misoperation or forgets to cancel the lock screen state, and greatly improves human-machine interaction performance of the terminal.

Figure 8:
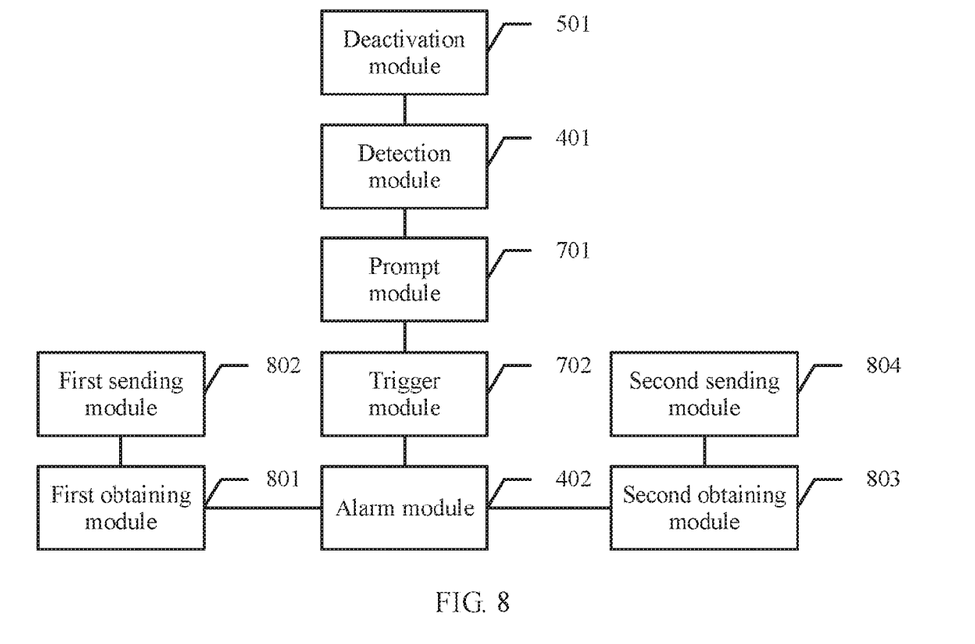
FIG. 8 is another schematic structural diagram of a terminal according to an embodiment of the present disclosure.

In the foregoing embodiment, the alarm module 402 controls the terminal to increase the volume and/or play the alarm tone by using the loudspeaker. However, this is effective only in a scenario in which a user discovers in a timely manner that a terminal is lost and a thief is nearby. In an application, when a received specific instruction is not executed, related information of a current user may further be obtained and uploaded. Referring to FIG. 8, in another embodiment of the terminal in the embodiments of the present disclosure, the foregoing terminal further includes: a first obtaining module 801 configured to obtain a biometric feature of a current user when the alarm module 402 skips executing the specific instruction; and a first sending module 802 configured to upload the biometric feature obtained by the first obtaining module 801 to a preconfigured server, and/or send the obtained biometric feature to another terminal.

Optionally, the terminal may further include: a second obtaining module 803 configured to obtain, when the alarm module 402 skips executing the specific instruction, an environmental parameter of an environment in which a current user is located; and a second sending module 804 configured to upload the environmental parameter obtained by the first obtaining module 801 to a preconfigured server, and/or send the obtained environmental parameter to another terminal.

In this embodiment of the present disclosure, when the alarm module 402 skips executing the received specific instruction, the first obtaining module 801 may obtain the biometric feature of the current user, and the second obtaining module 803 may obtain the environmental parameter of the environment in which the current user is located. The first sending module 802 uploads the obtained biometric feature to the preconfigured server, and/or sends the obtained biometric feature to the another terminal, and the second sending module 804 uploads the obtained environmental parameter to the preconfigured server, and/or sends the obtained environmental parameter to the another terminal. In this way, if the user does not discover in a timely manner that the terminal is lost, or the lost terminal is not near the user, the user may obtain information about the current user that is received by the preconfigured server or the another terminal, and turn to a police station for help, so as to find the lost terminal.

Figure 9:
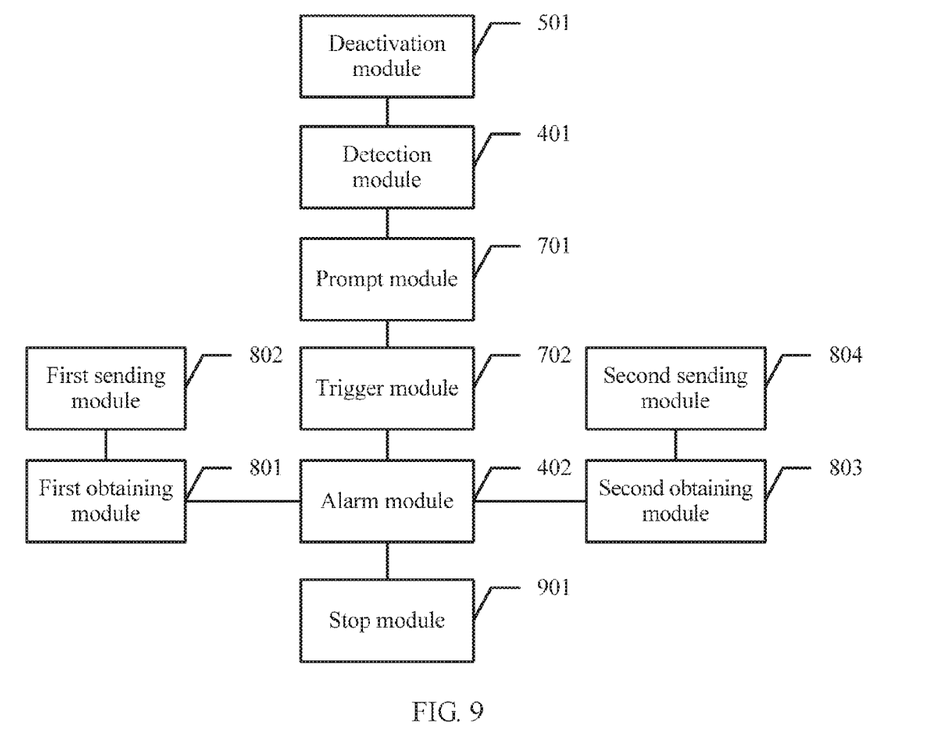
FIG. 9 is another schematic structural diagram of a terminal according to an embodiment of the present disclosure.

In the foregoing embodiment, the alarm module 402 may play the alarm tone. In an application, if it is a user misoperation, continuously playing an alarm tone may affect user experience. Referring to FIG. 9, in another embodiment of the terminal in the embodiments of the present disclosure, the foregoing terminal further includes: a stop module 901 configured to: when the alarm module 402 plays an alarm tone by using a loudspeaker, stop playing the alarm tone when a lock screen state is canceled.

In this embodiment, when the alarm module 402 plays the alarm tone by using the loudspeaker, if the lock screen state is canceled, the stop module 901 may stop playing the alarm tone. In this way, if the terminal plays the alarm tone because the user misoperation, the user may confidently cancel the lock screen state, and the alarm tone is stopped playing, so as to improve human-machine interaction performance of the terminal.

For ease of understanding the foregoing embodiments, the following describes an interaction process of the modules of the foregoing terminal in a specific application scenario.

At a train station, the terminal of a user A is stolen by a thief B.

To prevent the user A from calling the terminal after the user A discovers that the terminal is lost, the thief B gives a switch-off instruction to the terminal.

After the terminal receives the switch-off instruction, the detection module 401 detects that the terminal is currently in a lock screen state, and the prompt module 701 prompts the user to cancel the lock screen state of the terminal.

The thief B does not know an unlocking password, and cannot cancel the lock screen state of the terminal after two attempts. At this time, a 5-second preset unlocking time expires. The terminal determines that the lock screen state is not canceled in 5 seconds, and the trigger module 702 triggers the alarm module 402 to skip executing the switch-off instruction, adjust volume to a maximum, and play an alarm tone by using a loudspeaker.

At this time, the thief B takes out a headset, and inserts the headset into a headset jack of the terminal to prevent the terminal from generating a sound. After the terminal receives a headset insertion instruction, the prompt unit 602 prompts the user to cancel the lock screen state of the terminal. If the thief cannot cancel the lock screen state of the terminal in the preset 5 seconds, the deactivation unit 601 deactivates the headset insertion and keeps the loudspeaker effective to continuously play the alarm tone.

At the same time, the first obtaining module 801 detects a fingerprint of the thief B by using a touchscreen, and photographs a picture of the thief B by using a camera, and the second obtaining module 803 locks a current position of the thief B by using a built-in GPS. The first sending module 802 sends the obtained fingerprint and picture of the thief B to a preconfigured server, and the second sending module 804 sends the obtained current position of the thief B to another preset terminal.

The user A discovers in a timely manner that the terminal is lost after the terminal is stolen, and hears the alarm tone ringing nearby.

The user A immediately finds the thief B according to the position of the ringing alarm tone, and finds the lost terminal.

Figure 10:
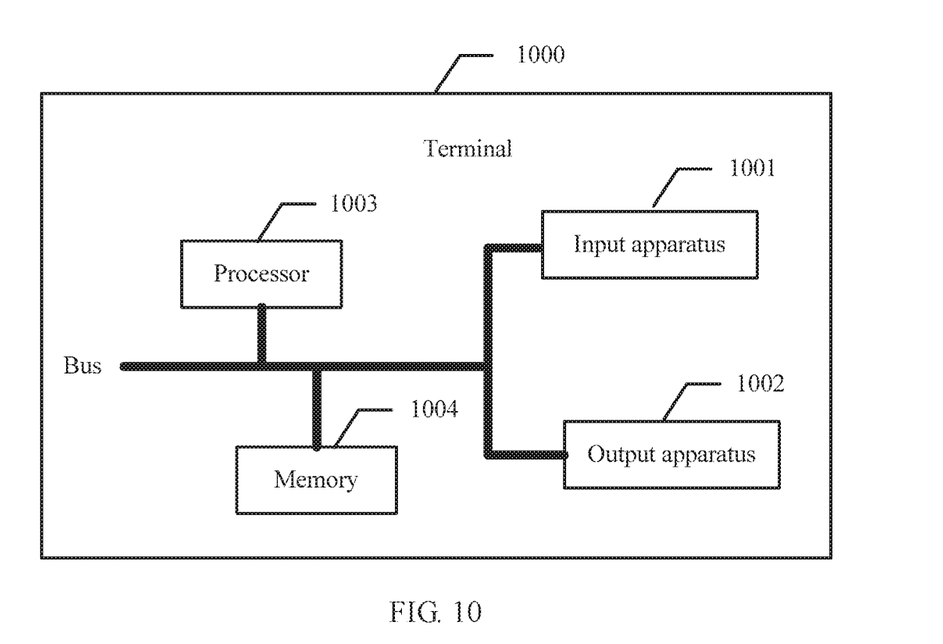
FIG. 10 is another schematic structural diagram of a terminal according to an embodiment of the present disclosure.

Referring to FIG. 10, another embodiment of the terminal in the embodiments of the present disclosure includes: an input apparatus 1001, an output apparatus 1002, a processor 1003, and a memory 1004 (a terminal 1000 may have one or more processors 1003, and one processor 1003 is used as an example in FIG. 10). In some embodiments of the present disclosure, the input apparatus 1001, the output apparatus 1002, the processor 1003, and the memory 1004 may be connected by using a bus or in another manner. In FIG. 10, a bus connection is used as an example.

The output apparatus 1002 includes a loudspeaker.

By invoking an operation instruction stored in the memory 1004, the processor 1003 is configured to perform the following steps: detecting, when receiving a specific instruction, whether the terminal is currently in a lock screen state, where the specific instruction is used to represent an instruction of controlling the terminal to decrease volume and/or an instruction of preventing the terminal from receiving a carrier signal; and skipping executing the specific instruction when detecting that the terminal is in the lock screen state, and controlling the terminal to increase the volume and/or play an alarm tone by using the loudspeaker.

In some embodiments of the present disclosure, the specific instruction includes a switch-off instruction, a mute instruction, a volume decreasing instruction, or a SIM-card removing instruction.

In some embodiments of the present disclosure, the processor 1003 is further configured to perform the following step: when headset insertion is detected in the lock screen state, deactivating the headset insertion and keeping the loudspeaker effective.

In some embodiments of the present disclosure, the processor 1003 is further configured to perform the following steps: prompting a user to cancel the lock screen state of the terminal before deactivating the headset insertion; and if the lock screen state is not canceled in a first predetermined time, triggering the step of the deactivating the headset insertion.

In some embodiments of the present disclosure, the processor 1003 is further configured to perform the following steps: prompting a user to cancel the lock screen state of the terminal before skipping executing the specific instruction; and if the lock screen state is not canceled in a second predetermined time, triggering the step of the skipping executing the specific instruction.

Figure 11:
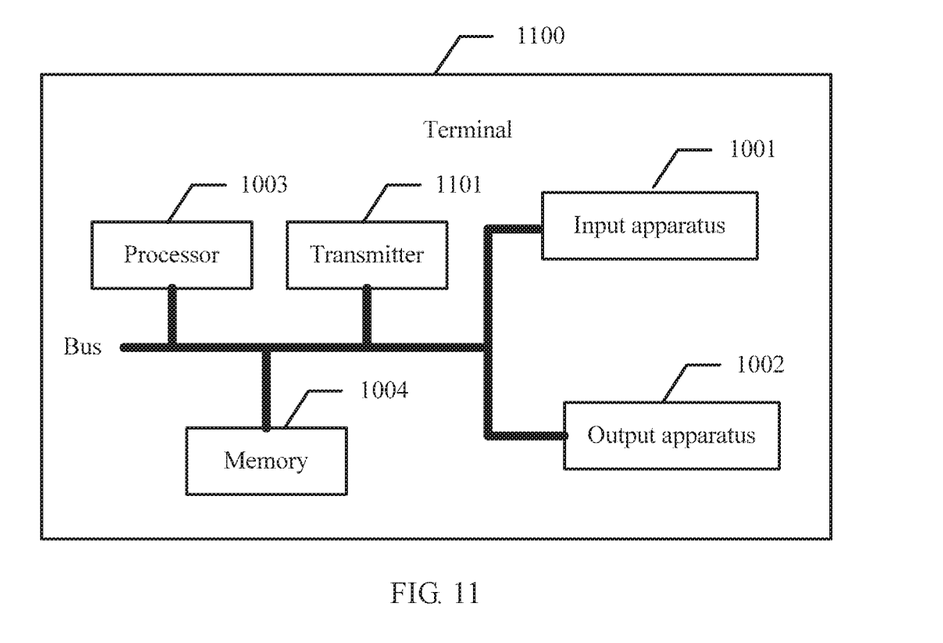
FIG. 11 is another schematic structural diagram of a terminal according to an embodiment of the present disclosure.

Referring to FIG. 11, in another embodiment of the terminal in the embodiments of the present disclosure, the foregoing terminal further includes a transmitter 1101. The transmitter 1101 is connected to a processor 1003, and the processor 1003 is further configured to perform the following steps: obtaining a biometric feature of a current user; and instructing the transmitter 1101 to upload the obtained biometric feature to a preconfigured server, and/or instructing the transmitter 1101 to send the obtained biometric feature to another terminal.

Optionally, in another embodiment of the terminal in the embodiments of the present disclosure, in a terminal 1100 shown in FIG. 11, the processor 1003 is further configured to perform the following steps: obtaining an environmental parameter of an environment in which a current user is located; and instructing the transmitter 1101 to upload the obtained environmental parameter to a preconfigured server, and/or instructing the transmitter 1101 to send the obtained environmental parameter to another terminal.

In some embodiments of the present disclosure, the processor 1003 is further configured to perform the following step: when an alarm tone is played by using a loudspeaker, stopping playing the alarm tone if a lock screen state is canceled.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in some embodiments. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present disclosure. The foregoing storage medium includes: any medium that can store program code, such as a universal serial bus (USB) flash drive, a removable hard disk, a read-only memory (ROM), a random access memory (RAM), a magnetic disk, or an optical disc.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A terminal anti-lost method comprising:
   receiving, by a terminal, a specific instruction, wherein the specific instruction comprises at least one of an instruction for controlling the terminal to decrease its volume or an instruction for preventing the terminal from receiving a carrier signal;
   in response to receiving the specific instruction, detecting, by the terminal, whether the terminal is currently in a lock screen state;
   skipping, by the terminal, execution of the specific instruction when the terminal is in the lock screen state and controlling the terminal to increase a volume and/or play an alarm tone from a loudspeaker; and
   executing, by the terminal, the specific instruction when the terminal is not in the lock screen state.

2. The method of claim 1, wherein the instruction for controlling the terminal to decrease its volume comprises one or more of a switch-off instruction, a mute instruction, or a volume decreasing instruction, and wherein the instruction for preventing the terminal from receiving a carrier signal comprises one or more of the switch-off instruction or a subscriber identity module-card (SIM-card) removing instruction.

3. The method of claim 1, further comprising:
   detecting, by the terminal, headset insertion when a headset is inserted into the terminal; and
   deactivating, by the terminal, the headset insertion when the terminal is in the lock screen state.

4. The method of claim 3, further comprising:
   prompting, by the terminal, a user to cancel the lock screen state of the terminal prior to deactivating the headset insertion; and
   deactivating the headset insertion when the lock screen state of the terminal is not canceled in a predetermined time.

5. The method of claim 1, further comprising:
   prompting, by the terminal, a user to cancel the lock screen state of the terminal prior to skipping executing the specific instruction; and
   skipping, by the terminal, the execution of the specific instruction when the lock screen state of the terminal is not canceled in a predetermined time.

6. The method of claim 1, further comprising:
   obtaining, by the terminal, a biometric feature; and
   uploading the biometric feature to a server.

7. The method of claim 1, further comprising:
obtaining, by the terminal, an environmental parameter of an environment in which the terminal is located; and
uploading the environmental parameter to a server.

8. The method of claim 1, further comprising stop playing, by the terminal, the alarm tone when the lock screen state of the terminal is canceled.

9. The method of claim 1, further comprising:
obtaining, by the terminal, a biometric feature; and
sending the biometric feature to another terminal.

10. The method of claim 1, further comprising:
obtaining, by the terminal, a biometric feature;
uploading the biometric feature to a server; and
sending the biometric feature to the other terminal.

11. The method of claim 1, further comprising:
obtaining, by the terminal, an environmental parameter of an environment in which the terminal is located; and
sending the environmental parameter to another terminal.

12. The method of claim 1, further comprising:
obtaining, by the terminal, an environmental parameter of an environment in which the terminal is located;
uploading the environmental parameter to a server; and
sending the environmental parameter to the other terminal.

13. A terminal, comprising:
a loudspeaker;
an input device;
a memory comprising operating instructions; and
a processor coupled to the loudspeaker, the input device, and the memory, wherein the operating instructions cause the processor to be configured to:
  receive a specific instruction, wherein the specific instruction comprises at least one of an instruction for controlling the terminal to decrease its volume or an instruction for preventing the terminal from receiving a carrier signal;
  in response to receiving the specific instruction, detect whether the terminal is currently in a lock screen state;
  skip execution of the specific instruction when the terminal is in the lock screen state control the terminal to increase a volume and/or play an alarm tone from the loudspeaker; and
  execute the specific instruction when the terminal is not in the lock screen state.

14. The terminal of claim 13, wherein controlling the terminal to decrease its volume comprises one or more of a switch-off instruction, a mute instruction, or a volume decreasing instruction, and wherein the instruction for preventing the terminal from receiving a carrier signal comprises one or more of the switch-off instruction or a subscriber identity module-card (SIM-card) removing instruction.

15. The terminal of claim 13, wherein the operating instructions further cause the processor to be configured to:
detect a headset insertion when a headset is inserted into the terminal; and
deactivate the headset insertion when the terminal is in the lock screen state.

16. The terminal of claim 15, wherein the operating instructions further cause the processor to be configured to:
prompt a user to cancel the lock screen state of the terminal before deactivating the headset insertion; and
deactivate the headset insertion when the lock screen state is not canceled in a predetermined time.

17. The terminal of claim 13, wherein the operating instructions further cause the processor to be configured to:
prompt a user to cancel the lock screen state of the terminal before skipping the specific instruction; and
skip execution of the specific instruction when the lock screen state is not canceled in a predetermined time.

18. The terminal of claim 13, further comprising a transmitter, wherein the operating instructions further cause the processor to be configured to:
obtain a biometric feature; and
either transmit the biometric feature to a server, transmit the biometric feature to another terminal, or transmit the biometric feature to each of the server and the other terminal.

19. The terminal of claim 13, wherein the terminal further comprises a transmitter; and wherein the operating instructions further cause the processor to be configured to:
obtain an environmental parameter of an environment in which the terminal is located; and
either transmit the environmental parameter to a server, transmit the environmental parameter to another terminal, or transmit the environmental parameter to each of the server and to the other terminal.

20. The terminal of claim 13, wherein the operating instructions further cause the processor to be configured to stop playing the alarm tone when the lock screen state is canceled.

* * * * *